(12) United States Patent
Magnusson et al.

(10) Patent No.: US 9,003,318 B2
(45) Date of Patent: Apr. 7, 2015

(54) METHOD AND APPARATUS FOR PROVIDING GRAPHICAL INTERFACES FOR DECLARATIVE SPECIFICATIONS

(75) Inventors: Martin Magnusson, Linköping (SE); Magnus Hallin, Linköping (SE)

(73) Assignee: Linden Research, Inc., San Francisco, CA (US)

( * ) Notice: Subject to any disclaimer, the term of this patent is extended or adjusted under 35 U.S.C. 154(b) by 218 days.

(21) Appl. No.: 13/116,032

(22) Filed: May 26, 2011

(65) Prior Publication Data

US 2012/0304093 A1    Nov. 29, 2012

(51) Int. Cl.
*G06F 3/048*    (2013.01)
*G06F 9/44*    (2006.01)

(52) U.S. Cl.
CPC .............. *G06F 9/4443* (2013.01); *G06F 8/313* (2013.01)

(58) Field of Classification Search
None
See application file for complete search history.

(56) References Cited

U.S. PATENT DOCUMENTS

| 6,533,663 | B1 * | 3/2003 | Iwao et al. ...................... 463/32 |
| 7,565,640 | B2 * | 7/2009 | Shukla et al. ................. 717/105 |
| 8,555,181 | B2 * | 10/2013 | Thorpe et al. ................. 715/763 |
| 2002/0065119 | A1 * | 5/2002 | Togami ............................ 463/4 |
| 2007/0060231 | A1 * | 3/2007 | Neveu et al. ...................... 463/5 |
| 2007/0226637 | A1 * | 9/2007 | Yaseen et al. ................. 715/762 |
| 2008/0104032 | A1 * | 5/2008 | Sarkar ............................. 707/3 |
| 2009/0106701 | A1 * | 4/2009 | Yalamanchi .................. 715/841 |
| 2009/0125822 | A1 * | 5/2009 | Karatal et al. ................. 715/762 |
| 2010/0205579 | A1 * | 8/2010 | Zhao et al. .................... 717/105 |
| 2010/0313157 | A1 * | 12/2010 | Carlsson et al. .............. 715/769 |
| 2011/0202859 | A1 * | 8/2011 | Fong .............................. 715/769 |
| 2012/0044138 | A1 * | 2/2012 | Lee et al. ....................... 345/156 |
| 2013/0007646 | A1 * | 1/2013 | Tranter ........................... 715/769 |

* cited by examiner

*Primary Examiner* — Anil N Kumar
(74) *Attorney, Agent, or Firm* — Vierra Magen Marcus LLP

(57) ABSTRACT

Example embodiments are directed towards graphical user interfaces for declarative specification languages that express the logic of a computation without describing its control flow. These user interfaces are based on a visual representation of specifications where geometric proximity may be the sole determinant of the resulting configuration. Modularity is improved as each proximal grouping is functionally independent of others. Moreover, a system that executes such specifications may treat groupings independently and execute them in parallel.

31 Claims, 6 Drawing Sheets

METHOD AND APPARATUS FOR PROVIDING GRAPHICAL INTERFACES FOR DECLARATIVE SPECIFICATIONS

BACKGROUND

Specification languages are formal languages used during software development to describe what the system is supposed to do without unnecessary details about how it is to be accomplished. Many of these specification languages have a visual representation, e.g. a graph, which is designed to make them more accessible and improve readability.

Figure 1A:
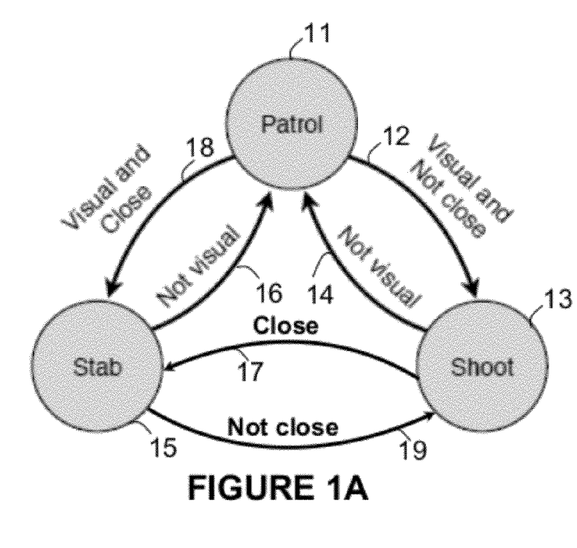
FIGS. 1A and 1B are illustrative examples of visual representations of specification languages.

FIG. 1A provides an example of a graph representation of a specification language in the form of a finite state machine, which may e.g. be employed by a computer game software developer. Specifically, the example provided in FIG. 1A illustrates a virtual shooting game in which game characters may execute specific behaviors based on their environment. Each circle 11, 13 and 15 may represent an action taken by the game character, while the transitions between actions may be provided by data indications represented by directed edges 12, 14, 16 and 18.

Thus, in the example provided by FIG. 1A, a game character may initially be configured to perform the patrol action 11. If the game character receives a data indication that a visual of a target has been obtained and the target is not close 12, the game character may transition to the shooting action 13. If a data indication specifies that a target visual is no longer obtained 14, the game character may transition back to a patrol action 11. Similarly, if the game character is currently executing a patrol action 11 and a data indication that a target visual which is close 18 is obtained, the game character may transition to a stabbing action 15. Once a data indication is received that a target visual is no longer obtained 16, the game character may transition back to a patrol action 11. Finally, if the game character is currently in the shoot action 13, and a data indication that the target is close 17 is obtained, then it may transition to the stab action 15. Conversely, if the game character is currently in the stab action 15, and a data indication that the target is not close 19 is obtained, then it may transition to the shoot action 13.

Figure 1B:
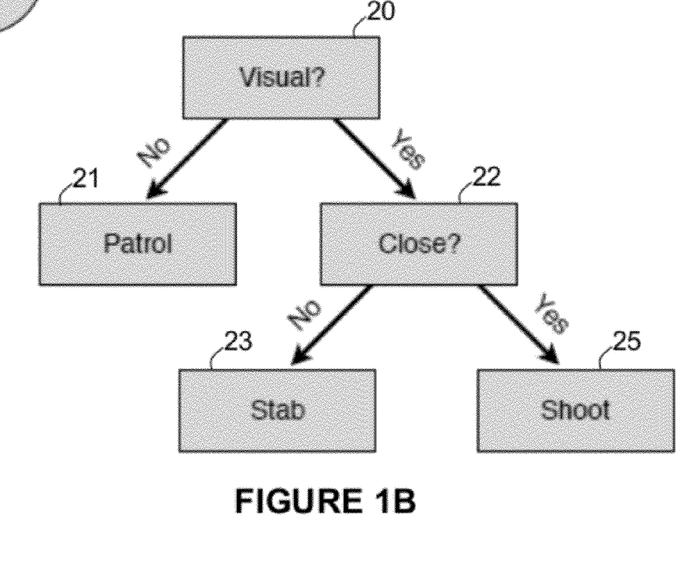

FIG. 1B provides another example of a graph representation of a specification language in the form of a decision tree. In the decision tree of FIG. 1B, data indications are represented by decision nodes 20 and 22, while actions are represented by leaf nodes 21, 23, and 25. Transitions from decision nodes to leaf nodes may be provided by the directed edges interconnecting the nodes.

Initially, a game character may be configured to wait for a data indication as to whether or not a visual of a target is obtained 20. If the decision from the visual data indicator 20 is negative, the game character may be configured to execute a patrol command 21. Thereafter, the game character may be configured to restart this transition process from the root node 20 of the decision tree. If the decision from the visual data indicator 20 is positive the game character may transition to a second data indication where a determination of whether or not the target is close may be made 22. If the decision from the closeness data indicator 22 is positive, the game character may transition to a shooting action 25 and thereafter restart at the root node 20. If the decision from the closeness data indicator 22 is negative, the game character may transition to a stabbing action 23 and thereafter restart at the root node 20.

SUMMARY

In the examples provided by FIGS. 1A and 1B, the altering of any action, data indication, and/or transition will have an impact on the entire finite state machine or decision tree. Specifically, if adding a state or data indication to either the finite state machine or decision tree, the transitions between the added state or data indication and other states or data indications may need to be configured as well. Furthermore, both the finite state machine and the decision tree have the limitation of allowing only a single state or action to occur at any given time.

Example embodiments presented herein may provide a graphical user interface with a visual representation of a specification language, which may be employed as a plug in component by software developers. The declarative nature of the specification language satisfies the desirable property of expressing the logic of a computation without its control flow, i.e. what the system is supposed to do but not necessarily how it is to be done. Moreover, in the specification language, states and actions may be represented by predicates, and transitions between actions and data indications may be expressed independently of one another and without the use of directed graph edges. Thus, the software developer may have the flexibility to alter parts of the specification without having to alter the entire representation. Finally, the specification may also represent the execution of multiple actions or data indications at any given time.

Some example embodiments may be directed towards a method for declarative specification. The method may comprise receiving an adjustment input through a user interface. The adjustment input may indicate a change in a spatial relationship of a first predicate with respect to a second predicate. The method may further comprise altering a declarative specification as a function of the adjustment input.

Some example embodiments may be directed towards a system for declarative specification. The system may comprise a receiving unit that may be configured to receive an adjustment input through a user interface. The adjustment input may indicate a change in a spatial relationship of a first predicate with respect to a second predicate. The system may further comprise a processing unit that may be configured to alter a declarative specification as a function of the adjustment input.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 2:
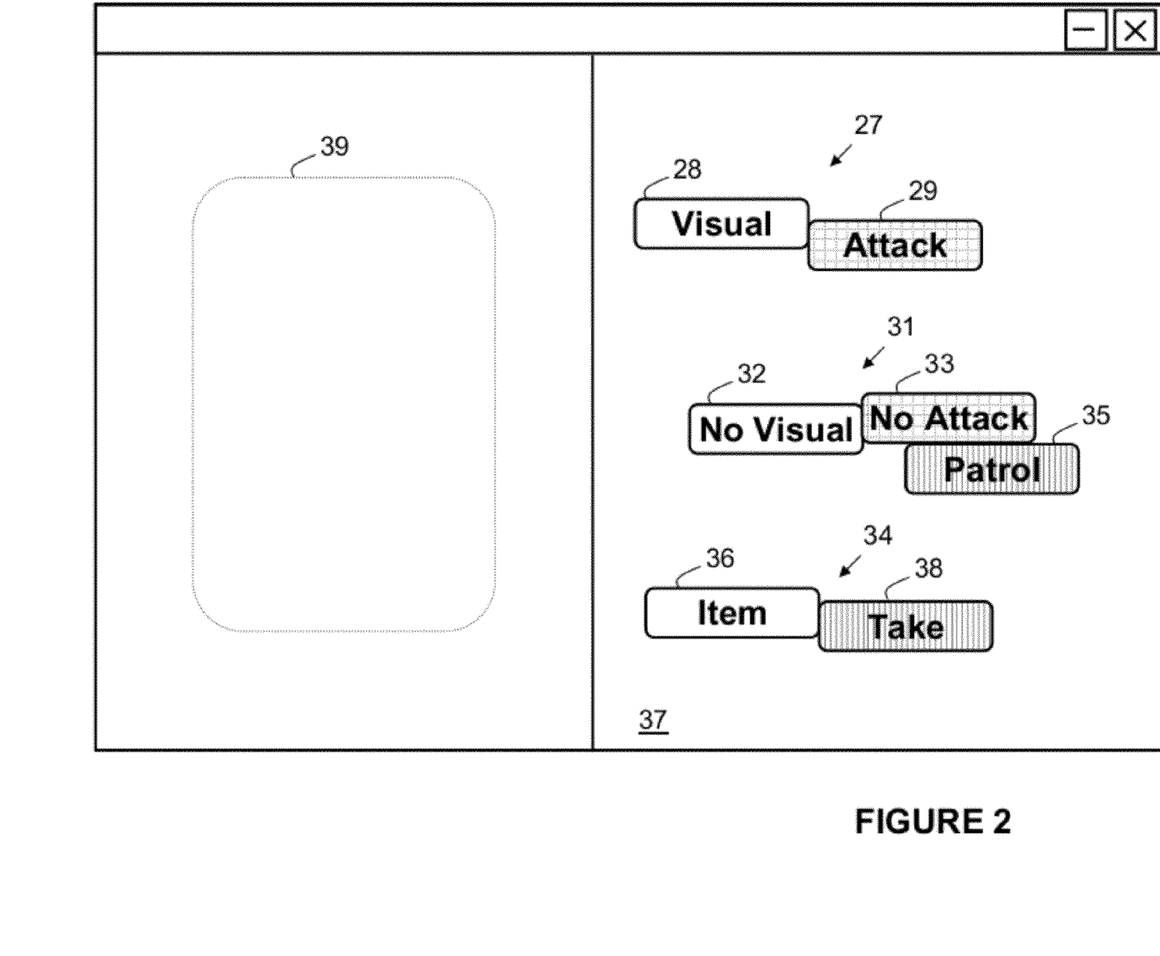
FIG. 2 is a schematic of a user interface featuring predicates, according to some of the example embodiments.

Some example embodiments presented herein are directed towards visual representations of declarative specifications. Through the use of adjustment inputs to the visual representation, the target system may be altered in real time. FIG. 2 illustrates a graphical user interface which may provide visual representations of declarative specifications, according to some of the example embodiments. The user interface may comprise a spilt screen, or two separate screens. The first section of the spilt screen may feature a declaration specification area 37. The second section of the split screen may provide a view of the real time execution 39 of the specification represented by the visual representation 37. Thus, a software developer may alter or amend the program via the declaration specification area 37 while viewing the effects of the alteration in the real time execution screen 39. It should be appreciated that a software developer may also provide declarative specifications offline as well. Thus, declarative specifications may be performed at least in part in real time.

A number of predicates are illustrated in the declaration specification area 37 as an example. Utilizing the virtual shooting game example of FIGS. 1A and 1B, the predicates of FIG. 2 are arranged to demonstrate the same character behaviour as previously discussed. For example, in the predicate grouping 27 a visual data indication predicate 28 is grouped in close proximity to an attack predicate 29. Thus, if the game character obtains a visual of a target, the game character may initiate an attack behavior.

A user or software developer may specify this declarative specification, or logical relationship between two or more predicates, by moving the predicate icons on a screen. For example, a user may employ a click and/or drag operation in grouping the predicates, thereby providing the declarative specification. It should also be appreciated that a user may form predicate groupings by moving the various predicates with the use of a touch screen input system. The user interface may receive information regarding a declarative relationship via an adjustment input from a user. The adjustment input may indicate a spatial relationship, or change in such a relationship, between one or more predicates. Thus, predicates that are touching or are in close proximity may form a declarative specification relationship. The proximity value in which two predicates are determined to be in a functional relation may be user programmable. It should also be appreciated that the flow of declarative specification of two or more predicates may be determined from top to bottom, left to right, or any other configuration which may be user programmable.

It should also be appreciated that declaration specifications or predicate groupings may comprise any number of predicates or levels. For example, in predicate grouping 31 a no visual data indicator 32 may be grouped with a no attack predicate 33, which may in turn be grouped with a patrol action predicate 35. Thus, if the no visual data indication 32 yields a positive result, the no attack predicate 33 may be evoked, and simultaneously the patrol action predicate 35 may be evoked or executed. Therefore, if the game character does not have a visual of a target, the game character may be configured to patrol. As an additional example, in predicate grouping 34, an item data indicator 36 may be grouped with a take action predicate 38. Thus, if the game character receives a positive data indication that an item is in sight, the game character may execute a taking action on the item.

As can be seen in FIG. 2, all of the declaration specifications or predicate groupings are independent of one another. Therefore, if a software developer were to add an additional predicate grouping, alterations to the pre-existing predicate groupings would not have to be made. In contrast, if changes were made to any node of the finite state machine or decision tree of FIGS. 1A and 1B, respectively, relationships among other nodes will have to be altered as well. Furthermore, it should be appreciated that the three example predicate groupings of FIG. 2 may all be executed simultaneously. The simultaneous execution of nodes is not possible with the finite state machine or decision tree visualizations.

Figure 3:
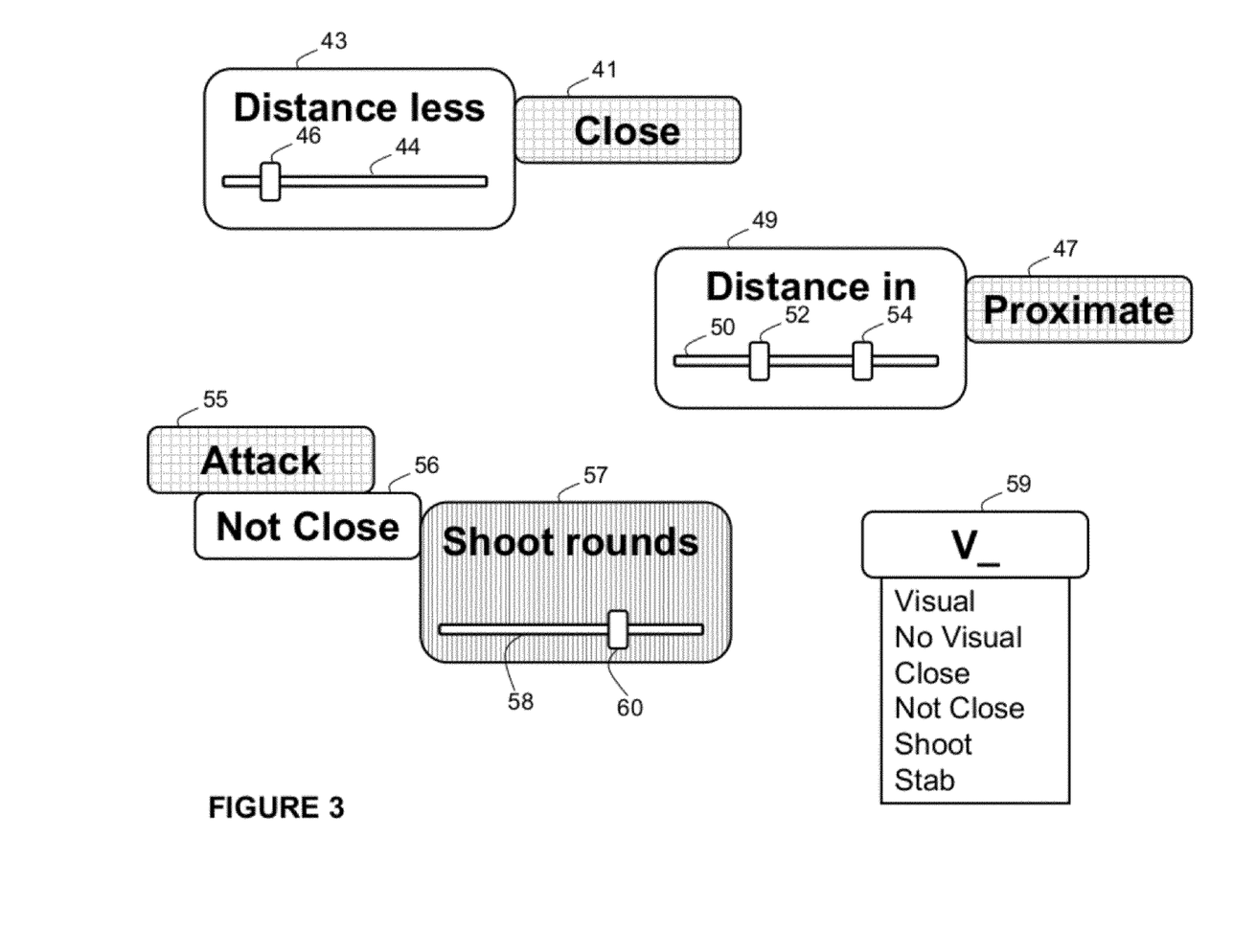
FIG. 3 is an illustrative example of predicate alteration, according to some of the example embodiments.

In some example embodiments, changes or alterations to pre-existing predicates may also be provided. FIG. 3 provides three examples of sub-parameterized predicates. A sub-parameterized predicate is a predicate in which one or more predicate parameters can be provided or modified.

As shown in FIG. 3, a distance data indicator may be altered to change a value of a data threshold which determines when an object is close (icon 41). Specifically, a distance threshold 43 may be altered by selecting a distance value from a range of distances. The selection may be provided via a scroll bar 44 representing the different distance values and a lever 46 representing the selected value.

It should also be appreciated that a range of data values may be selected. For example, a distance data indicator 47 may be defined by a threshold data range 49, which determines when an object is proximate. The threshold data range may be selected via a scroll bar 50 and a plurality of levers 52 and 54. Thus, if an item or target falls within the selected range the predicate associated with the data indicator may yield a positive result.

It should further be appreciated that predicate alteration may be provided for action predicates. For example, a shoot rounds action predicate 57 may be altered in terms of the number of rounds to fire if an attack predicate 55 and a not close data indicator 56 is found to be true. The number of rounds used for shooting may be altered via a scroll bar 58 and lever 60. It should also be appreciated that the use of scroll bars and levers are provided merely as examples and any other form of indicating a data alteration may be provided. For example, a user may type a data threshold value into a data field. It should further be appreciated that type boxes or drop down menus may also be used to alter predicate types as shown by modified predicate 59 of FIG. 3. In fact, any type of predicate, e.g. actions and data indications, may be altered in any manner, e.g. predicate type and threshold values.

Figure 4:
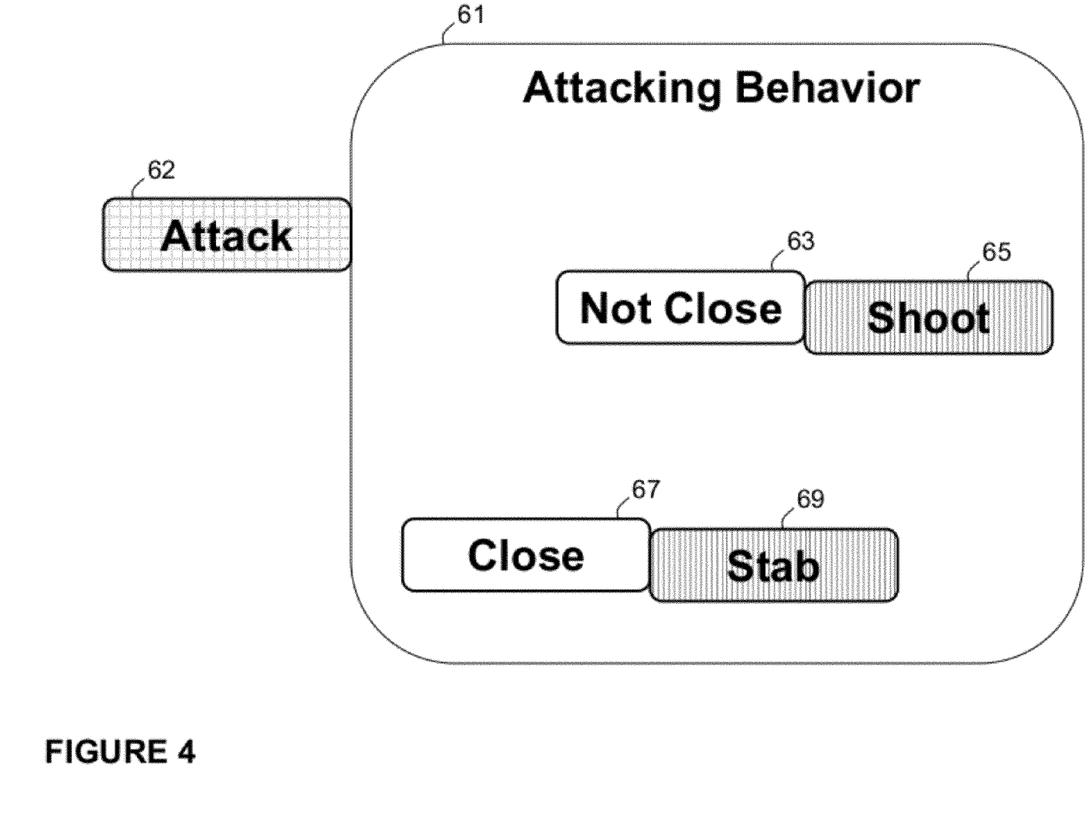
FIG. 4 is a schematic of a hierarchical predicate, according to some of the example embodiments.

In some example embodiments, predicates may be hierarchical as shown in FIG. 4 where different aspects of an attacking behavior are defined within a single hierarchical attacking behavior predicate 61. For example, if an attack predicate 62 is executed and a not close data indicator 63 is positive, a shooting action predicate 65 may be executed. Similarly, if an attack predicate 62 is executed and a close data indicator 67 is positive, a stabbing action predicate 69 may be executed. Using hierarchical predicates may simplify declaration specifications for a user by abstracting away the attack predicate 62 from all rules inside the hierarchical attacking behavior 61. Also, instead of having to define all of the different options for an attacking behavior, such a behavior may already be defined in a library as a hierarchical predicate. It should be appreciated that in some example embodiments a user may have the flexibility to create his or her own hierarchical predicates as well as edit pre-existing hierarchical predicates stored in a library. It should further be appreciated that any type of predicate may be defined in a hierarchical manner and that a hierarchical predicate may comprise any number of predicate groupings, where the predicate groupings may comprise any number of levels.

Figure 5:
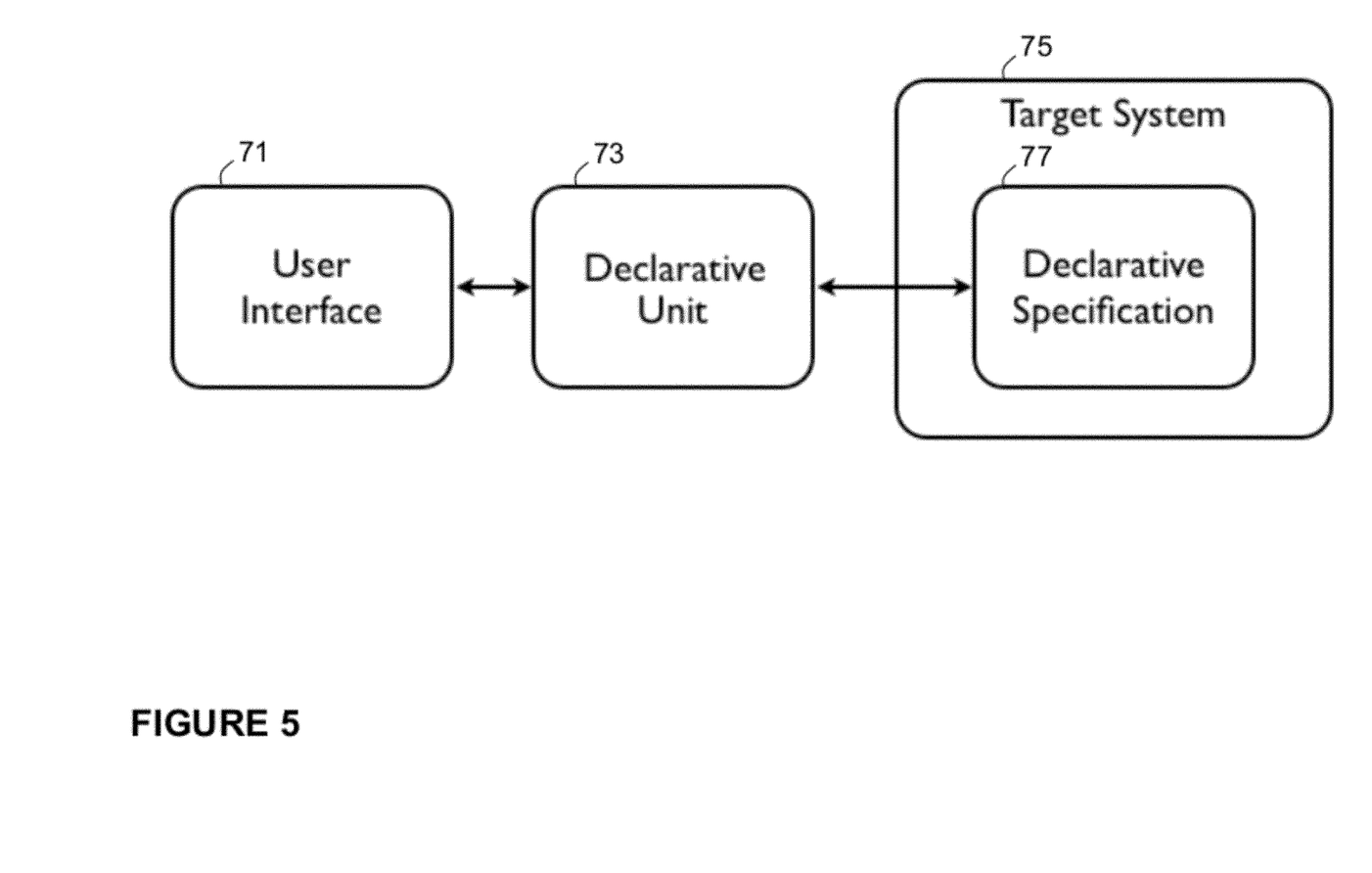
FIG. 5 is a schematic of a system which may use some of the example embodiments.

FIG. 5 illustrates an overview of a system which may utilize the example embodiments. A user interface 71 may provide the visual representation of the specification language and receive any alteration or programming information from a user or software developer. The received information may be in the form of an adjustment input. The adjustment input may indicate a change in a spatial relationship between two predicates, e.g. two predicates placed in close proximity to one another in either a vertical or horizontal position. It should be appreciated that the adjustment input may also indicate an alteration in a pre-existing predicate, as discussed above. A declarative unit 73 may be configured to receive data from the user interface 71 and provide the declarative specifications 77. The declarative specifications 77 may e.g. be in the form of propositional or first-order logical formulas where predicates placed in vertical proximity form conjunctions and predicates placed in horizontal proximity form implications. The declarative unit 73 may thereafter assign the declarative specifications 77 to the target system or program 75, which may have an effect on that system's behavior. This effect may e.g. be caused by the declarative specifications 77 serving as the input to a propositional or first-order logical inference mechanism that is part of the target system 75.

Figure 6:
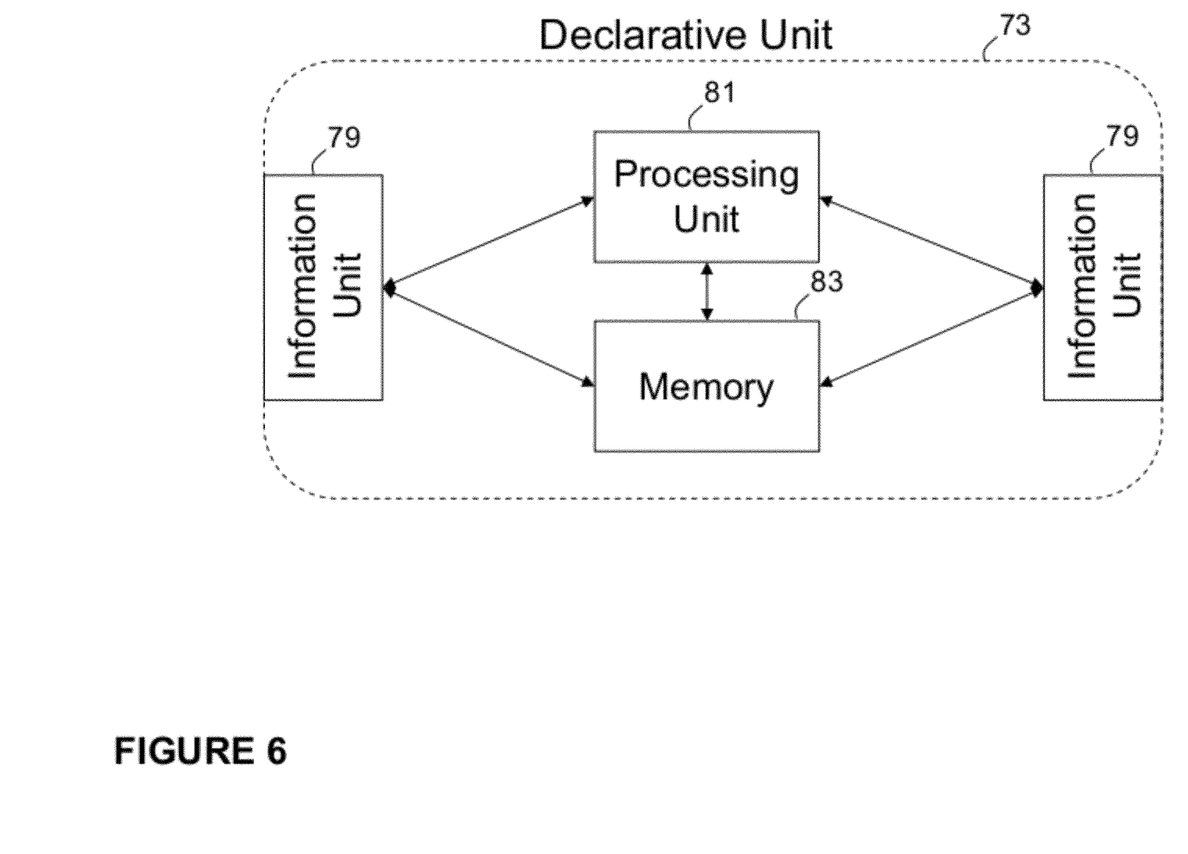
FIG. 6 is a block diagram of a declarative unit, according to some of the example embodiments.

FIG. 6 illustrates an example of a declarative unit 73. The declarative unit 73 may comprise any number of information units 79, which may be able to transmit or receive any number or type of signals or data. It should be appreciated that the declarative unit 73 may alternatively comprise a single transceiver port. The information units or transceiver port may be in the form of any input/output communications port known in the art.

The declarative unit 73 may also comprise at least one memory unit 83. The memory unit 83 may be configured to store received, transmitted, and/or measured data, executable program instructions, and/or a programming library. At least one memory unit 83 may be any suitable type of computer readable memory and may be of volatile and/or non-volatile type. The declarative unit 73 may also comprise a processing unit 81. The processing unit 81 may be any suitable type of computation unit, e.g. a microprocessor, digital signal processor (DSP), field programmable gate array (FPGA), or application specific integrated circuit (ASIC).

In some example embodiments the processing unit 81 may be configured to apply the declarative specifications based on the adjustment input from the user. The processing unit 81 may further be configured to send instructions or the declarative specifications to the target system 75.

Example embodiments comprising interactive visualization of specification languages have been provided herein. Using the example embodiments, a user may modify a program in real time through the use of declarative specification. It should be appreciated that while the example embodiments have been explained with the use of a game environment, the embodiments may be utilized in various other applications.

For example, the example embodiments may be utilized for facility control or management. Specifically, a facility manager may utilize the user interface of FIG. 2 to define declarative specifications using predicates which define actions dealing with facility control. For example, the turning off of the lights of a facility may be provided as an action predicate which may be grouped with a data indicator predicate specifying a time of day or period of non-movement within the building. It should be appreciated that any other forms of facility control may be defined by predicates and managed through declarative specification, according to some of the example embodiments presented herein.

Another application may be the specification of the underlying logic of PC, web, or smart phone applications. Graphical user interface elements such as buttons would be represented by data indication predicates and their grouping with action predicates would control what the button does. This embodiment could enable users without programming experience to develop such applications.

Other example application of the embodiments may be various forms of automation. For example, a mechanical device, industrial robotic equipment, or toy robot may be controlled using the user interface and predicates defining mechanical movement in response to data sensing. Furthermore, any form of rule based system (e.g., income tax applications) may also be controlled or implemented using the embodiments discussed herein. It should also be appreciated that the example embodiments presented herein may also be used for educational purposes. Specifically, declarative specification may be used to introduce a pupil to software programming, while the user interface of FIG. 2 may be utilized to show the pupil the effects of the programming in real time. Finally, one may want to integrate the graphical user interface 71 and declarative unit 73 within the target system 75 in order to create a system where the end user has the ability to configure the system itself through the methods described above or variants thereof.

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) terminal, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments.

A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method for instructing a programmable computer, the method comprising:
   receiving from a user through a user interface, an adjustment input to move an icon on a screen to a position in which the icon is touching one or more other icons to form a first grouping, the first grouping comprises an icon of a first data indication predicate touching an icon of a first action predicate, and the first data indication predicate is positive or negative based on a position of a game character relative to an object in a computer game;
   a declarative specification for controlling the game character in the computer game as a function of the first grouping, wherein the first grouping is a logical implication in which the game character performs a respective action identified by the icon of the first action predicate when the first data indication predicate is positive and the game character does not perform the respective action identified by the icon of the first action predicate when the first data indication predicate is negative; and
   during the computer game, in response to the declarative specification, allowing the game character to perform the respective action identified by the icon of the first action predicate when the first data indication predicate is positive and not allowing the game character to perform the respective action identified by the icon of the first action predicate when the first data indication predicate is negative; wherein:
      one section of the screen comprises a declarative specification area, the adjustment input is received via the declarative specification area and displays the icon of the first data indication predicate and the icon of the first action predicate; and
      another section of the screen provides a view of a real time execution of the declarative specification, showing in real time, an effect of the adjustment input on the computer game as the declarative specification is altered.

2. The method of claim 1, wherein the first data indication predicate and/or the first action predicate corresponds to a command execution.

3. The method of claim 1, wherein:
   the first data indication predicate indicates whether the game character is close, within a distance threshold, or proximate, within a range of distance thresholds, to the object in the computer game;
   an icon for modifying the distance threshold or the range of distance thresholds is provided on the screen proximate to the icon of the first data indication predicate;
   an input is received from the user via the icon for modifying, to modify the distance threshold or the range of distance thresholds; and
   the respective action identified by the icon of the first action predicate is performed based on a value of the first data indication predicate relative to the distance threshold or the range of distance thresholds.

4. The method of claim 1, further comprising altering a predicate type and/or value by choosing the predicate type and/or value via a drop down menu and/or predictive text entry.

5. A system for declarative specification, the system comprising:
   a memory, the memory stores executable instructions; and
   a microprocessor, the microprocessor is configured to execute the executable instructions to:
      a receiving unit configured to receive from a user through a user interface, an adjustment input to move an icon on a screen to a position in which the icon is touching one or more other icons to form a first grouping, the first grouping comprises an icon of a first data indication predicate touching an icon of a first action predicate, and the first data indication predicate is positive or negative based on a position of a game character relative to an object in a computer game;
      alter a declarative specification for controlling the game character in the computer game as a function of the first grouping, wherein the first grouping is a logical implication in which the game character performs a respective action identified by the icon of the first action predicate when the first data indication predicate is positive and the game character does not perform the respective action identified by the icon of the first action predicate when the first data indication predicate is negative; and
      and during the computer game, in response to the declarative specification, allow the game character to perform the respective action identified by the icon of the first action predicate when the first data indication is positive and not allow the game character to perform the respective action identified by the icon of the first action predicate when the first data indication is negative; wherein:
         one section of the screen comprises a declarative specification area, the adjustment input is received via the declarative specification area and displays the icon of the first data indication predicate and the icon of the first action predicate; and
         another section of the screen provides a view of a real time execution of the declarative specification, showing in real time, an effect of the adjustment input on the computer game as the declarative specification is altered.

6. The system of claim 5, wherein the adjustment input is caused by the user via at least one of a touch screen interface or a drag and drop interface.

7. The system of claim 5, wherein the first data indication predicate and/or first action predicate is at least one of a sub-parameterized predicate or a hierarchical predicate.

8. The method of claim 1, wherein:
   a flow of the declarative specification is from left to right on the screen and the icon of the first action predicate is positioned horizontally with respect to the icon of the first data indication predicate, or the flow of the declarative specification is from top to bottom on the screen; and the icon of the first action predicate is positioned vertically with respect to the icon of the first data indication predicate.

9. The method of claim 1, wherein:
the first data indication predicate is a sub-parameterized predicate;
an icon for modifying a range of values for the first data indication predicate is provided on the screen proximate to the icon of the first data indication predicate;
an input is received from the user via the icon for modifying, to modify the range of values; and
the respective action identified by the icon of the first action predicate is performed based on a value of the first data indication predicate relative to the range of values.

10. The method of claim 1, wherein:
the first action predicate is a sub-parameterized predicate;
an icon for modifying a value for the respective action identified by the icon of the first action predicate is provided on the screen proximate to the icon of the first action predicate;
an input is received from the user via the icon for modifying a value for the respective action identified by the icon of the first action predicate; and
the respective action identified by the icon of the first action predicate is performed based on the value of the first data indication predicate relative to the value for the respective action identified by the icon of the first action predicate.

11. The method of claim 1, wherein:
the adjustment input causes an icon of an additional predicate representing an additional action to be grouped with the icon of the first action predicate, thereby also causing the respective action identified by the icon of the first action predicate and the additional action to be performed simultaneously based on a value of the first data indication predicate.

12. A computer implemented method, comprising:
receiving from a user through a user interface, an adjustment input to move an icon on a screen to a position in which the icon is touching one or more other icons to form a first grouping, the first grouping comprises an icon of a first data indication predicate touching an icon of a first action predicate, wherein the first data indication predicate is positive or negative based on a position of a game character relative to an object in a computer game;
receiving from the user through the user interface, another adjustment input to move another icon on the screen to a position in which the another icon is touching one or more other icons to form a second grouping separate from the first grouping, the second grouping comprises an icon of a second data indication predicate touching an icon of a second action predicate, the second data indication predicate is positive or negative based on the position of the game character relative to the object in the computer game, the second data indication predicate is positive when the first data indication predicate is negative, and negative when the first data indication predicate is positive;
altering a declarative specification for controlling the game character in the computer game as a function of the first grouping and the second grouping, wherein: (a) the first grouping is a logical implication, based on a proximity of the icon of the first data indication predicate to the icon of the first action predicate, in which the game character performs a respective action identified by the icon of the first action predicate when the first data indication predicate is positive and (b) the second grouping is a logical implication, based on a proximity of the icon of the second data indication predicate to the icon of the second action predicate, in which the game character performs a respective action identified by the icon of the second action predicate when the second data indication predicate is positive; and
during the computer game, in response to the declarative specification, allowing the game character to perform the respective action identified by the icon of the first action predicate when the first data indication predicate is positive and to perform the respective action identified by the icon of the second action predicate when the second data indication predicate is positive; wherein:
one section of the screen comprises a declarative specification area, the adjustment input is received via the declarative specification area and displays the icon of the first data indication predicate and the icon of the first action predicate; and
another section of the screen provides a view of a real time execution of the declarative specification, showing in real time, an effect of the adjustment input on the computer game as the declarative specification is altered.

13. The computer implemented method of claim 12, wherein:
the first data indication predicate is positive when the game character has a visual of the object in the computer game; and
the second data indication predicate is positive when the game character does not have the visual of the object in the computer game.

14. The computer implemented method of claim 13, wherein:
the respective action identified by the icon of the first action predicate comprises an attack action; and
the respective action identified by the icon of the second action predicate comprises a patrol action.

15. The computer implemented method of claim 12, wherein:
the first data indication predicate is positive when the game character is close, within a distance threshold, to the object in the computer game; and
the second data indication predicate is positive when the game character is not close to the object in the computer game.

16. The computer implemented method of claim 15, wherein:
the respective action identified by the icon of the first action predicate a shooting action; and
the respective action identified by the icon of the second action predicate a stabbing action.

17. The method of claim 1, wherein:
the first data indication predicate is positive or negative based on whether the game character has a visual of the object in the computer game.

18. The method of claim 17, wherein:
the respective action identified by the icon of the first action predicate comprises at least one of a patrol action, an attack action or a taking action based on whether the game character has the visual of the object in the computer game.

19. The method of claim 1, wherein:
the first data indication predicate indicates whether the game character is close, within a distance threshold to the object in the computer game.

20. The method of claim 19, wherein:
the respective action identified by the icon of the first action predicate comprises at least one of a patrol action, an attack action or a taking action based on whether the game character is close to the object in the computer game.

21. The method of claim 1, wherein:
the respective action identified by the icon of the first action predicate comprises a shooting action;
the first data indication predicate indicates whether the game character is close, within a distance threshold, to the object in the computer game;
an icon for modifying a number of rounds to fire based on whether the game character is close to the object is provided on the screen proximate to the icon of the first action predicate;
an input is received from the user via the icon for modifying the number of rounds to fire, to modify the number of rounds to fire; and
the respective action identified by the icon of the first action predicate is performed based on a value of the first data indication predicate relative to the distance threshold.

22. The method of claim 1, wherein:
the respective action identified by the icon of the first action predicate comprises an attack action;
the first data indication predicate indicates whether the game character is close, within a distance threshold, to the object in the computer game;
an icon for designating one behavior of the attack action if the game character is close to the object is provided on the screen proximate to the icon of the first action predicate;
an icon for designating another behavior of the attack action if the game character is not close to the object is provided on the screen proximate to the icon of the first action predicate; and
the respective action identified by the icon of the first action predicate is performed according to the one behavior or the another behavior based on a value of the first data indication predicate relative to the distance threshold.

23. The method of claim 1, further comprising:
receiving from the user through the user interface, another adjustment input to move another icon on the screen to a position in which the another icon is touching one or more other icons to form a second grouping separate from the first grouping, the second grouping comprises an icon of a second data indication predicate touching an icon of a second action predicate, the second data indication predicate is positive or negative based on the position of the game character relative to the object in the computer game, the second data indication predicate is positive when the first data indication predicate is negative, and negative when the first data indication predicate is positive;
altering the declarative specification for controlling the game character in the computer game as a function of the second grouping; and
during the computer game, in response to the declarative specification, causing the game character to perform a respective action identified by the icon of the second action predicate when the second data indication predicate is positive.

24. The method of claim 1, further comprising:
receiving from the user through the user interface, another adjustment input to move an icon of a second action predicate on the screen to a position in which the icon of the second action predicate is touching one or more icons of the first grouping and becomes part of the first grouping;
altering the declarative specification for controlling the game character in the computer game as a function of the first grouping with the icon of the second action predicate; and
during the computer game, in response to the declarative specification, causing the game character to perform a respective action identified by the icon of the second action predicate in addition to the respective action identified by the icon of the first action predicate when the first data indication predicate is positive.

25. The method of claim 24, wherein:
the first data indication predicate is positive or negative based on whether the game character has a visual of the object in the computer game;
the respective action identified by the icon of the first action predicate comprises a no attack action; and
the respective action identified by the icon of the second action predicate comprises a patrol action.

26. The method of claim 1, further comprising:
receiving from the user through the user interface, another adjustment input to move an icon of a second data indication predicate on the screen to a position in which the icon of the second data indication predicate is touching an icon of a second action predicate to form a second grouping which is associated with the first action predicate, the second data indication predicate is positive or negative based on the position of the game character relative to the object in the computer game,
altering the declarative specification for controlling the game character in the computer game as a function of the second grouping; and
during the computer game, in response to the declarative specification, causing the game character to perform a respective action identified by the icon of the second action predicate when the first data indication predicate and the second data indication predicate are positive, wherein the respective action identified by the icon of the second action predicate is an option under the first action predicate.

27. The method of claim 26, wherein:
the first data indication predicate is positive or negative based on whether the game character has a visual of the object in the computer game;
the respective action identified by the icon of the first action predicate comprises an attack action;
the second data indication predicate indicates whether the game character is close or not close to the object in the computer game; and
the respective action identified by the icon of the second action predicate comprises a shoot action or a stab action.

28. The method of claim 26, further comprising:
receiving from the user through the user interface, a further adjustment input to move an icon of a third data indication predicate on the screen to a position in which the icon of the third data indication predicate is touching an icon of a third action predicate to form a third grouping which is associated with the first action predicate, the third data indication predicate is positive or negative based on the position of the game character relative to the object in the computer game, the third data indication predicate is positive when the second data indication predicate is negative and negative when the second data indication predicate is positive;
altering the declarative specification for controlling the game character in the computer game as a function of the third grouping; and during the computer game, in response to the declarative specification, causing the game character to perform a respective action of the third action predicate when the first data indication predicate is positive and the third data indication predicate is positive, wherein the respective action of the third action predicate is another option under the first action predicate.

29. The method of claim 1, wherein:
the first data indication predicate is positive or negative based on whether the game character has a visual of the object in the computer game; and
the respective action identified by the icon of the first action predicate comprises at least one of a patrol action, an attack action, a no attack action or a taking action.

30. The method of claim 1, wherein:
the altering interprets the first grouping is the logical implication based on a horizontal proximity of the icon of the first data indication predicate to the icon of the first action predicate.

31. The system of claim 5, wherein:
the processing unit is configured to interpret the first grouping is the logical implication based on a horizontal proximity of the icon of the first data indication predicate to the icon of the first action predicate.

* * * * *